United States Patent
Kan (10) Patent No.: US 10,348,120 B2
(45) Date of Patent: Jul. 9, 2019

(54) SYSTEM AND METHOD FOR CHARGING OF ELECTRIC VEHICLE

(71) Applicant: Kam Yuen Kan, Hong Kong (HK)

(72) Inventor: Kam Yuen Kan, Hong Kong (HK)

( * ) Notice: Subject to any disclaimer, the term of this patent is extended or adjusted under 35 U.S.C. 154(b) by 119 days.

(21) Appl. No.: 15/481,477

(22) Filed: Apr. 7, 2017

(65) Prior Publication Data

US 2017/0331321 A1 Nov. 16, 2017

Related U.S. Application Data

(60) Provisional application No. 62/334,409, filed on May 10, 2016.

(51) Int. Cl.
| | |
|---|---|
| *H02J 7/00* | (2006.01) |
| *H02J 7/04* | (2006.01) |
| *B60L 11/18* | (2006.01) |
| *H02J 13/00* | (2006.01) |

(52) U.S. Cl.
CPC .......... *H02J 7/041* (2013.01); *B60L 11/1809* (2013.01); *H02J 7/0047* (2013.01); *H02J 7/045* (2013.01); *H02J 13/0006* (2013.01); *H02J 2007/0096* (2013.01)

(58) Field of Classification Search
CPC .......... H02J 7/041; H02J 7/045; H02J 7/0047; B60L 11/1809
USPC .......................... 320/109; 701/22; 705/14.58
See application file for complete search history.

(56) References Cited

U.S. PATENT DOCUMENTS

| | | | |
|---|---|---|---|
| 2013/0035812 A1 | 2/2013 | Bernard | |
| 2013/0041850 A1 | 2/2013 | LaFrance | |
| 2013/0110632 A1* | 5/2013 | Theurer | G06F 1/266 705/14.58 |
| 2013/0341264 A1* | 12/2013 | Kidwell | B01D 63/103 210/321.83 |

FOREIGN PATENT DOCUMENTS

CN 105429254 A 3/2016

OTHER PUBLICATIONS

Search and Examination Report of British Patent Application No. 1706538.4 dated Oct. 24, 2017.

* cited by examiner

*Primary Examiner* — Zixuan Zhou (57) ABSTRACT

Disclosed is a system and method for controlling charging of an electric vehicle. The system captures metadata and at least one input value from a user device present in a charging location. The metadata is associated with a charging device, installed at the charging location, capable of charging one or more electric vehicles. The at least one input value corresponds to at least one charging parameter of a plurality of charging parameters associated with charging of an electric vehicle belonging to a user of the user device. The system computes values corresponding to one or more other parameters of the plurality of charging parameters based upon the at least one input value captured from the user device. The system displays the values computed on the user device for validation by the user. The system further transmits one or more control commands to the charging device to charge the electric vehicle.

15 Claims, 8 Drawing Sheets

SYSTEM AND METHOD FOR CHARGING OF ELECTRIC VEHICLE

CROSS-REFERENCE TO RELATED APPLICATIONS AND PRIORITY

The present application claims priority from U.S. Provisional Patent Application No. 62/334,409 dated May 10, 2016, the entirety of which is incorporated herein by a reference.

TECHNICAL FIELD

The present application relates to a charging control for electric vehicle (EV). More particularly, the present application relates to a system and method for remotely controlling charging for the electric vehicle via a portable user device.

BACKGROUND

Fossil fuel vehicles contribute over 50% of the air pollution. The fossil fuel vehicles release exhaust gases in the environment. The exhaust gases may form complex compounds which are harmful to the environment. In the recent times, people are preferring using an Electric Vehicle (EV) as the EV has zero emission of hazardous gases and particles.

However, the EV has a limited traveling range so the driver may have to timely charge the EV. Most of the drivers of the EV are facing an issue regarding charging of the EV. During travel by the EV, the driver is not aware of what amount of charging is required for travelling certain distance? or what time is required for full charge? These phenomena are not clear to the drivers that deter the drivers from switching to EV.

Currently, there is no standard practice for the charging station. Each charging station is operated differently. It takes time for the drivers to familiarize with the equipment and operations at the charging station. Some charging stations charge by time while others charge by energy consumed in KWH. The drivers have no say in that and simply follow the hard procedure. There is a need of an alternative that may enable the drivers to understand and facilitate the charging of the EV as per the requirement.

SUMMARY

Before the present apparatuses, methods and systems along with components related thereto are described, it is to be understood that this application is not limited to the particular methods, apparatuses, systems and their arrangement as described, as there can be multiple possible embodiments which are not expressly illustrated in the present application but may still be practicable within the scope of the invention. It is also to be understood that the terminology used in the description is for the purpose of describing the particular versions or embodiments only, and is not intended to limit the scope of the present application. This summary is provided to introduce concepts related to devices and methods for facilitating wireless charging of one or more portable electronic devices and the concepts are further described below in the detailed description. This summary is not intended to identify essential features of the claimed subject matter nor is it intended for use in determining or limiting the scope of the claimed subject matter.

In one embodiment, a system for controlling charging of an electric vehicle is described. The system may comprise a system processor and a system memory. The system memory may be coupled with the system processor. The system processor may execute programmed instructions stored in the system memory. The system may be configured for capturing metadata and at least one input value from a user device present in a charging location. The metadata may be associated with a charging device, installed at the charging location, capable of charging one or more electric vehicles. The at least one input value may correspond to at least one charging parameter of a plurality of charging parameters associated with charging of an electric vehicle belonging to a user of the user device. The system may be configured for computing values corresponding to one or more other parameters of the plurality of charging parameters based upon the at least one input value captured from the user device. The system may be configured for displaying the values computed corresponding to the one or more other parameters along with the at least one input value on the user device for validation by the user. The system may be configured for transmitting one or more control commands to the charging device after the validation of the values and the at least one input value. The charging device may be identified based upon the metadata associated with the charging device. The one or more control commands may be indicative of charging the electric vehicle, by the charging device, based upon one or more of the validated values.

In another embodiment, a charging device enabling charging of an electric vehicle is described. The charging device may comprise one or more power switches, a power meter and a controller. The controller may further comprise a processor and a memory. The memory may be coupled with the processor. The processor may execute programmed instructions stored in the memory. The charging device may be configured for receiving one or more control commands from a system processor communicatively coupled with the said processor. The one or more control commands may be indicative of charging of an electric vehicle based upon values computed by the said system processor and at least one input value captured by the said system processor from a user device associated with a user of the electric vehicle. The values and the at least one input value correspond to a plurality of charging parameters associated with charging of an electric vehicle. The charging device may be configured for closing the one or more power switches to trigger the charging of the electric vehicle in accordance with the one or more commands received. The charging device may be configured for opening the one or more power switches after the charging of the electric vehicle in accordance with the one or more commands received. The charging device may be configured for reading an energy consumption value from the power meter, wherein the energy consumption value indicates a power consumed for the charging of the electric vehicle. The charging device may be configured for transmitting the energy consumption value to the system processor to enable the system processor to validate the charging of the electric vehicle in accordance with the one or more commands received.

In yet another embodiment, a method for controlling charging of an electric vehicle is described. The method may comprise capturing, by a system processor, metadata and at least one input value from a user device present in a charging location. The metadata may be associated with a charging device, installed at the charging location, capable of charging one or more electric vehicles. The at least one input value may correspond to at least one charging parameter of a plurality of charging parameters associated with charging of an electric vehicle belonging to a user of the user device. The method may comprise computing, by the system processor, values corresponding to one or more other parameters of the plurality of charging parameters based upon the at least one input value captured from the user device. The method may comprise displaying, by the system processor, the values computed corresponding to the one or more other parameters along with the at least one input value on the user device for validation by the user. The method may comprise transmitting, by the system processor, one or more control commands to the charging device after the validation of the values and the at least one input value. The charging device may be identified based upon the metadata associated with the charging device. The one or more control commands may be indicative of charging the electric vehicle, by the charging device, based upon one or more of the validated values. The method may comprise closing, by a processor of the charging device, one or more power switches to trigger the charging of the electric vehicle in accordance with the one or more commands received. The method may comprise opening, by the processor, the one or more power switches after the charging of the electric vehicle in accordance with the one or more commands received.

BRIEF DESCRIPTION OF THE FIGURES

The detailed description is described with reference to the accompanying Figures. In the Figures, the left-most digit(s) of a reference number identifies the Figure in which the reference number first appears. The same numbers are used throughout the figures to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Some embodiments of this application, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any apparatuses, devices and methods similar or equivalent to those described herein can be used in the practice or testing of embodiments of the present application, the exemplary, apparatuses, devices and methods are now described. The disclosed embodiments are merely exemplary of the application, which may be embodied in various forms.

Various modifications to the embodiments will be readily apparent to those skilled in the art and the generic principles herein may be applied to other embodiments. However, one of ordinary skill in the art will readily recognize that the present application is not intended to be limited to the embodiments illustrated, but is to be accorded the widest scope consistent with the principles and features described herein.

The present application relates to a system and method for controlling charging of Electric Vehicle (EV) at EV charging station. Users of the EV, via user device, may manage modes of charging and payment in a user-friendly way via a computer based platform. The present application may increase flexibility and may eventually reduce the cost of the EV charging station. The present application facilitating EV charging may be operated at diverse locations including, but not limited to, apartments, shopping centres and office/commercial buildings. The deployment or installation of the proposed system at these locations may be shared amongst multiple users within these locations to maximize utilization and thereby reducing overall deployment/installation cost.

Figure 1:
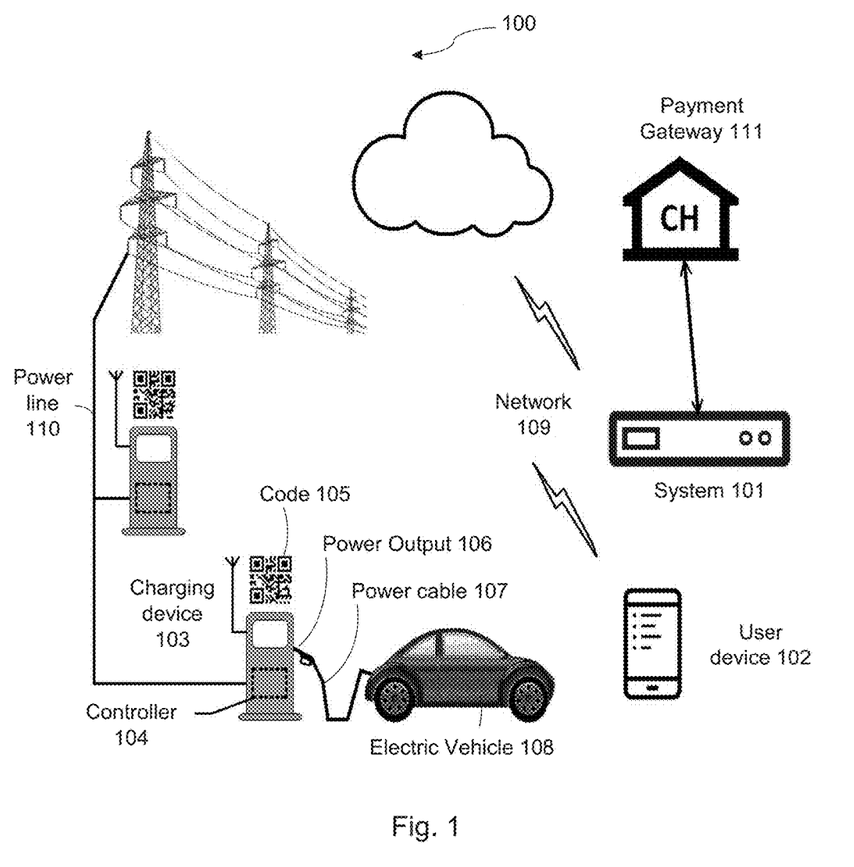
FIG. 1 illustrates a network implementation 100 of a system 101 for controlling charging of an electric vehicle 108, in accordance with an embodiment of the present application.

FIG. 1 illustrates a network implementation 100 of a system 110 for controlling charging of an electric vehicle 108, in accordance with an embodiment of the present application. In one embodiment, the system 101 may be connected to one or more user devices 102, one or more charging stations, a payment clearing house 111 via a network 109. The network 109 may be a wired or a wireless network. One or more power lines 110 may distribute/supply the power from the power company to the one or more charging stations. (Hereinafter the one or more charging stations may be collectively referred as the charging station). The charging station may be connected to electricity, via the one or more power lines 110, in order to provide charging of the one or more EV 108. The charging station may comprise one or more charging devices 103. (Hereinafter the one or more charging devices 103 may be collectively referred as the charging device 103. Hereinafter the one or more EV 108 may be collectively referred as the EV 108). The charging of the one or more EV 108 may be carried out via the charging device 103. The charging device 103 may include a controller 104, a code 105, an antenna and one or more power switches. The antenna may be configured for receiving and transmitting command from the system 101 via the network 109. The antenna may be further configured for receiving and transmitting status of the respective charging point to the system 101 via the network 109. The code 105 may be a 2-dimensional (2D) code, or a QR code, or a bar code, or an RFID code. The code 105 of the charging device 103 may comprise metadata associated with the charging device 103, wherein the metadata further comprises at least geospatial data, charging device type, charging speed, and charging rate.

The charging device 103 may further comprise a power cable 107 for providing power output 106 in order to charge the EV 108. The charging device 103 may provide two types of power (charging) output 106. The power output 106 may be medium charging speed and/or standard charging speed. The medium charging speed output may be in accordance with charging standards such as IEC, SAE or ChadeMo. The standard charging speed power output may be standard charge output obtained via household power socket of respective country. The power output 106 may be set via the user device 102 rather than a special control terminal. The power output setting, via the user device 102, may be transmitted to the system 101 via the network 109. The system 101 may further transmit a command, via the network 109, to the charging device 103. The charging device 103 may transmit a reading of energy/power consumption of the EV 108 to the system 101. An amount may be calculated by the system 101 based on the power output setting received via the user device 102. The amount may be further transmitted to the user device 102 for the payment. The payment may be settled by an electronic payment gateway 111 via the user device 102. Further, the reading of the energy consumption of the EV 108 may be received by the system 101 to validate the charging of the EV 108 based upon the amount paid by the user via the user device 102.

It may be understood that the system 101 may also be implemented in a variety of computing systems, such as a laptop computer, a desktop computer, a notebook, a workstation, a mainframe computer, a system, a network server, and the like. It will be understood that the system 101 may be accessed through one or more computing systems or applications residing on the computing systems. Examples of the computing systems may include, but are not limited to, a portable computer, a personal digital assistant, a handheld device, and a workstation. The computing systems may be communicatively coupled to the system 101 through the network 109.

In one embodiment, the network 109 may be a wireless network, a wired network or a combination thereof. The network 109 can be implemented as one of the different types of networks, such as intranet, local area network (LAN), wide area network (WAN), the internet, and the like. The network 109 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 109 may include a variety of network devices, including routers, bridges, servers, computing devices, storage devices, and the like.

Figure 2:
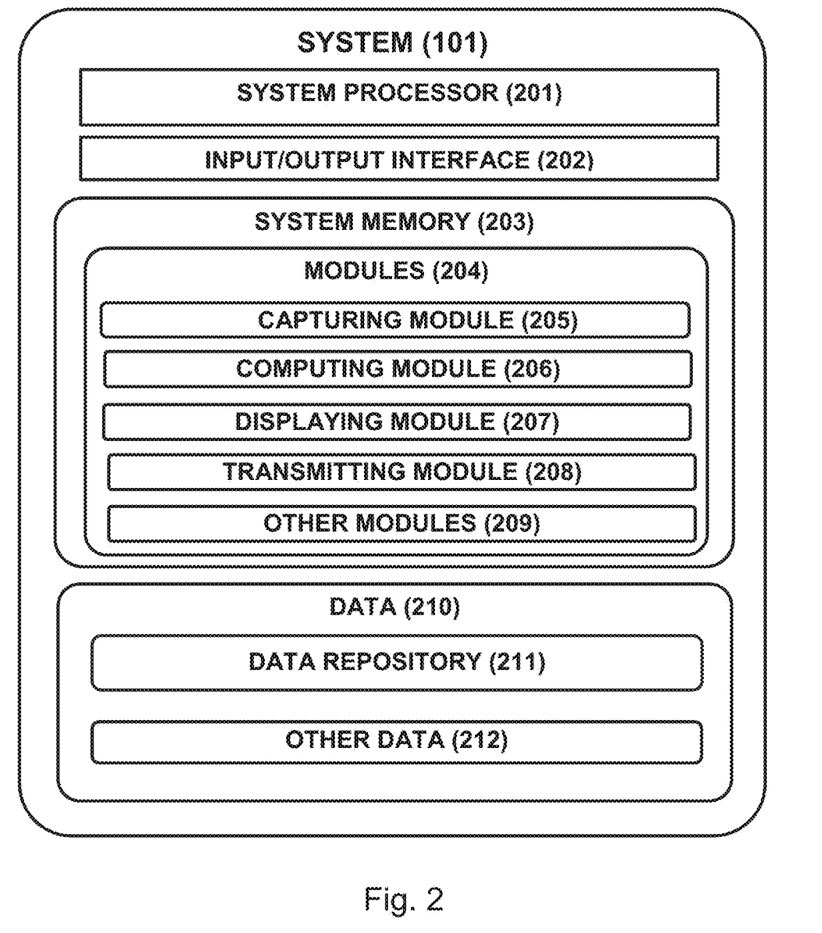
FIG. 2 illustrates the system 101, in accordance with an embodiment of the present application.

Referring now to FIG. 2, the system 101 is illustrated in accordance with an embodiment of the present application. In one embodiment, the system 101 may include at least one system processor 201, an input/output (I/O) interface 202, and a system memory 203. The at least one system processor 201 may be implemented as one or more microprocessors, microcomputers, microcontrollers, digital signal processors, central processing units, state machines, logic circuitries, and/or any devices that manipulate signals based on operational instructions. Among other capabilities, the at least one system processor 201 may be configured to fetch and execute computer-readable instructions stored in the system memory 203.

The I/O interface 202 may include a variety of software and hardware interfaces, for example, a web interface, a graphical user interface, and the like. The I/O interface 202 may allow the system 101 to interact with a user directly or through the user devices. Further, the I/O interface 202 may enable the system 101 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting a number of devices to one another or to another system.

The system memory 203 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The system memory 203 may include modules 204 and data 210.

The modules 204 include routines, programs, objects, components, data structures, etc., which perform particular tasks or implement particular abstract data types. In one implementation, the modules may include a capturing module 205, a computing module 206, a displaying module 207, a transmitting module 208 and other modules 209. The other modules 209 may include programs or coded instructions that supplement applications and functions of the system 101.

The data 210, amongst other things, serves as a repository for storing data processed, received, and generated by one or more of the modules 204. The data 210 may also include a data repository 211 and other data 212. The user profiles and other system data may be stored in the data repository 211. The other data 212 may include data generated as a result of the execution of one or more modules in the other modules 209.

The capturing module 205 may be configured to capturing metadata and at least one input value from a user device present in a charging location. The metadata may be associated with a charging device, installed at the charging location, capable of charging one or more electric vehicles. The at least one input value may correspond to at least one charging parameter of a plurality of charging parameters associated with charging of an electric vehicle belonging to a user of the user device.

The computing module 206 may be configured to compute values corresponding to one or more other parameters of the plurality of charging parameters based upon the at least one input value captured from the user device.

The displaying module 207 may be configured to display the values computed corresponding to the one or more other parameters along with the at least one input value on the user device for validation by the user.

The displaying module 207 may be configured to transmit one or more control commands to the charging device after the validation of the values and the at least one input value. The charging device may be identified based upon the metadata associated with the charging device. The one or more control commands are indicative of charging the electric vehicle, by the charging device, based upon one or more of the validated values.

Figure 3:
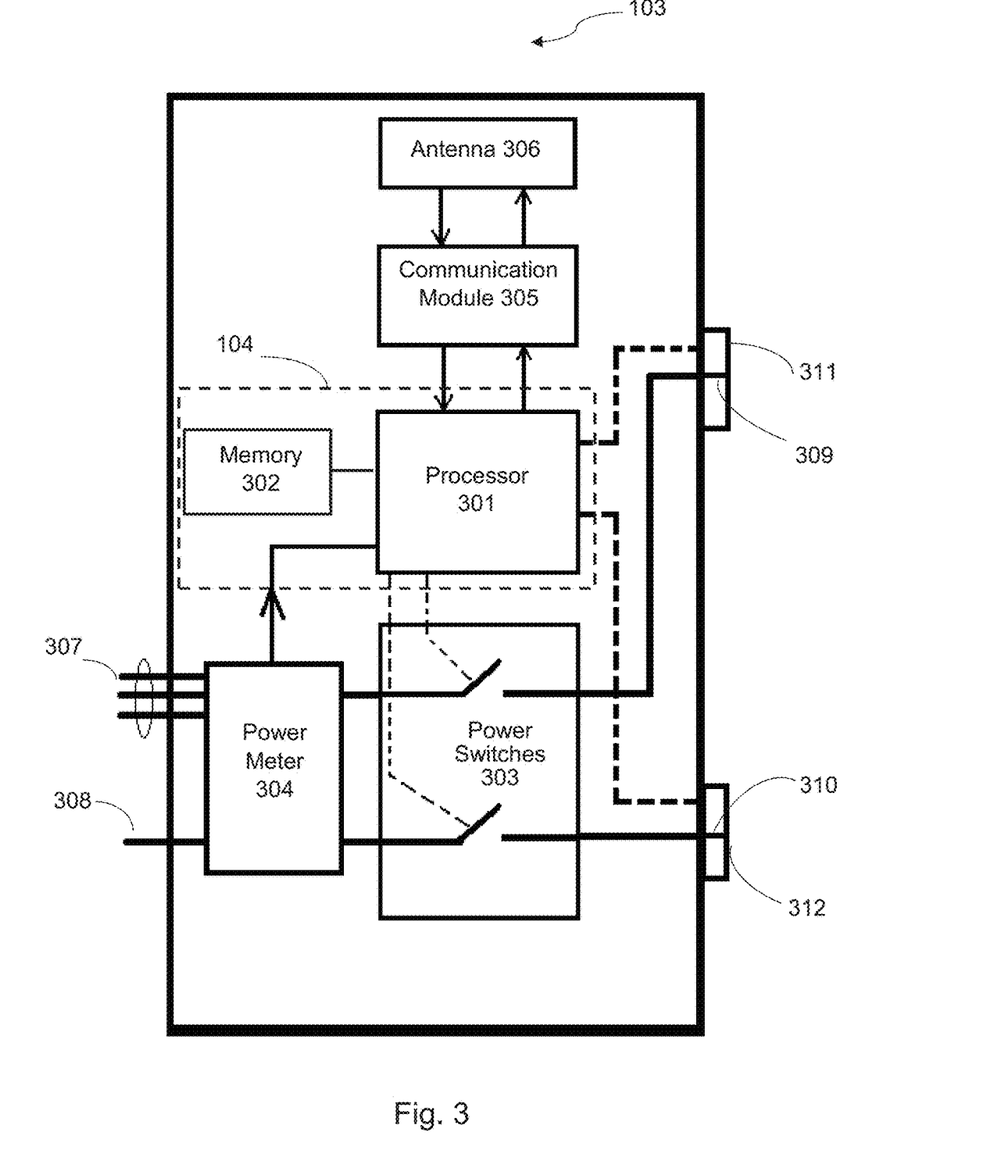
FIG. 3 illustrates detailed architecture of remotely controlled charging device 103, in accordance with an embodiment of the present application.

FIG. 3 illustrates detailed architecture of remotely controlled charging device 103, in accordance with an embodiment of the present application. In one embodiment, the charging device 103 may comprise a controller 104, an antenna 306, a code 105 (shown in FIG. 1), a communication module 305, a power meter 304 and one or more power switches 303. The controller 104 may comprise a processor 301 and a memory 302. The processor 301 may be implemented as one or more microprocessors, microcomputers, microcontrollers, digital signal processors, central processing units, state machines, logic circuitries, and/or any devices that manipulate signals based on operational instructions. The memory 302 may store programmed instructions. The processor 301 may be configured to fetch and execute computer-readable instructions stored in the memory 302. The memory 302 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The charging device 103 may receive one or more control commands from the system 101 communicatively coupled with the processor 301. The one or more control commands may be indicative of charging of the EV 108 based upon values computed by the system processor 201 and at least one input value captured by the system processor 201 from a user device 102 associated with a user of the electric vehicle 108. The values and the at least one input value correspond to a plurality of charging parameters associated with charging of an electric vehicle 108.

In one embodiment, an electricity may be supplied to the charging device 103 via one or more electricity inputs (307,308). The one or more electricity inputs (307,308) may be a single-phase power and a three-phase power. The charging device 103 may comprise one or more power switches 303. The one or more power switches 303 may be adapted to charge the EV 108 by supplying either of the single-phase power or the three-phase to the EV 108 via one or more output terminals (310,311) and a charging cable 107. The one or more power switches 303 may be controlled by the processor 301. The processor 301 may receive one or more commands, from the system 101, for opening or closing of the one or more power switches 303. The one or more power switches 303, when closed, may trigger the charging of the electric vehicle 108 in accordance with the one or more commands received by the processor 301. When the one or more power switches 303 are closed, the power output 106 of the charging device 103 may have the electricity for charging of the EV 108. For safety reasons, one or more safety covers (311,312) may be placed at the power output (309,310) of the charging device 103 respectively. The one or more safety covers (311,312) may be capable of being locked during the charging of the EV 108. The one or more safety covers (311,312) may further be capable of being unlocked after the charging of the EV 108.

The power meter 304 may read value of energy consumption for charging of the EV 108. The energy consumption value may indicate a power consumed for the charging of the EV 108. The reading may be based on input of one or more charging parameters via the user device 102. The reading may be further transmitted to the processor 301. The processor 301 may further relay the reading to the system 101 in order to enable the system 101 to validate the charging of the EV 108 in accordance with the one or more commands received by the processor 301. The system 101 may calculate an amount value for the charging of the EV 108. The processor 301 may further receive the command and charging data, based on input provided by the user device 102, from the system 101.

The one or more charging parameters and the commands may be communicated, via the communication module 305, to the processor 301. The signal may be communicated via the antenna 306. The one or more charging parameters and the commands of the charging device 103 may be encrypted and may be sent over the network 109.

Figure 4:
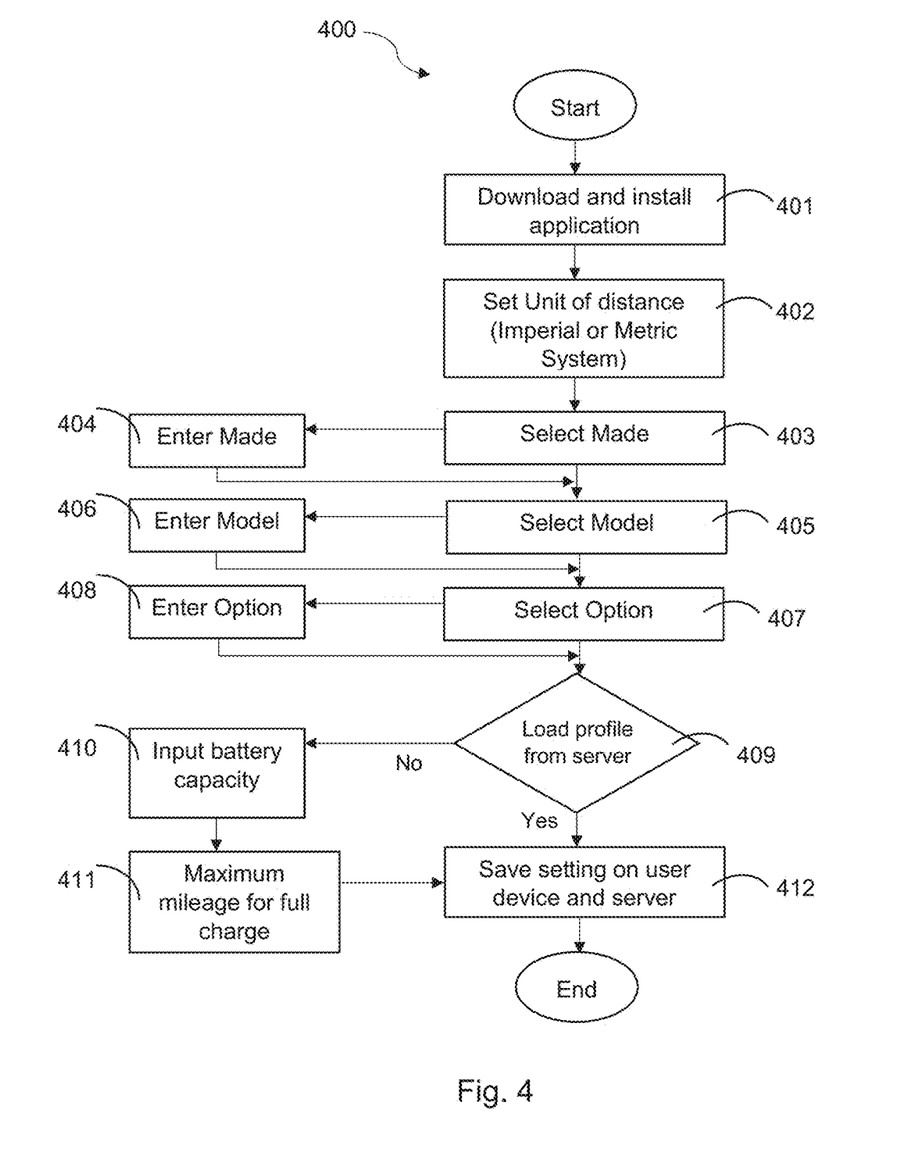
FIG. 4 illustrates a method 400 of setting of information of the EV via the user device 102, in accordance with an embodiment of the present application.

FIG. 4 illustrates a method 400 of setting of information of the EV via the user device 102, in accordance with an embodiment of the present application. The method 400 may enable calculation of plurality of charging parameters for the EV 108. The charging parameters for the EV 108 may include, but not limited to, distance, charging duration, percent of battery capacity, an energy input and a charging amount. In order to charge the EV 108, the user of the user device 102 may enter the information of the EV 108 as a setting for charging of the EV 108. The user may further create a profile by entering the information of the EV 108. The profile may be stored on the system 101. The profile may facilitate the settings, provided by the user, used for charging of the EV 108.

At step 401, the setting of the charging of the EV 108 may require download of appropriate software, in the form of an application, which is designed in accordance to the present application. The software may be installed on the user device 102 of the user/driver. The application, on the user device 102, may handle and calculate the charging parameters based on various measurement systems. In one embodiment, there are two sets of formulas for Metric or Imperial system.

At step 402, unit of the distance may be selected by choosing either Mile (Imperial system) or Kilometer (Metric system). If the imperial system is selected, formula for the imperial system may be utilized for the calculation. At step 403, make/brand of the EV 108 may be entered. The make/brand may be selected from an existing list available in database of the system 101. At step 404, the user/driver may enter the made/brand of the EV 108 manually, if the make/brand is not available in the existing list. The make/brand entered manually may be updated in the existing list. The updated list may be uploaded to the database of the system 101. At step 405, model of the EV 108 may be selected from a list. At step 406, the user/driver may enter the model of the EV 108 manually.

At step 407, the application may retrieve the other information of the EV 108 based on the make/brand and the model of the EV 108, such as battery capacity. The user/driver may further select an option related to charging such as the battery capacity. At step 408, the other information can be manually entered by the user/driver. At step 409, the system 101 may load an appropriate profile from the database based on the make/brand, model and option selected by the user/driver. The profile may further enable the system 101 to calculate the charging parameters during the charging of the EV 101. At step 410, the user/driver may manually enter the battery capacity if the profile is not found. At step 411, the user/driver may manually enter maximum distance for full charge of the EV 108. At step 412, a profile of the user/driver may be generated based on confirmation of the user/driver. The profile may be saved on the system 101 and the user device 102. The setting up of information for the EV 108 is completed and may be ready for charging at the charging device 103 at any time.

Figure 5A:
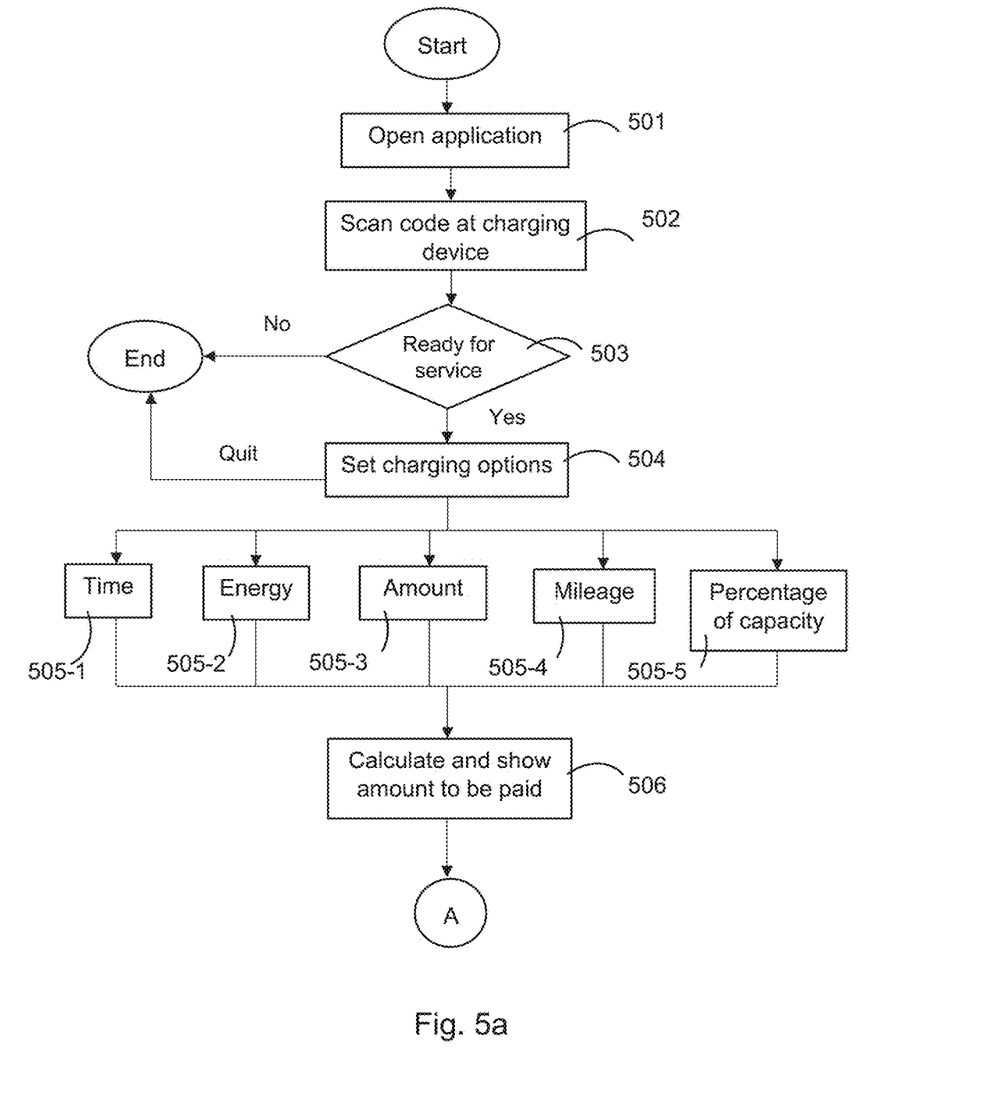
FIG. 5a and FIG. 5b illustrate remote control for starting and stopping the charging and payment at the charging device 103, in accordance with an embodiment of the present application.
Figure 5B:
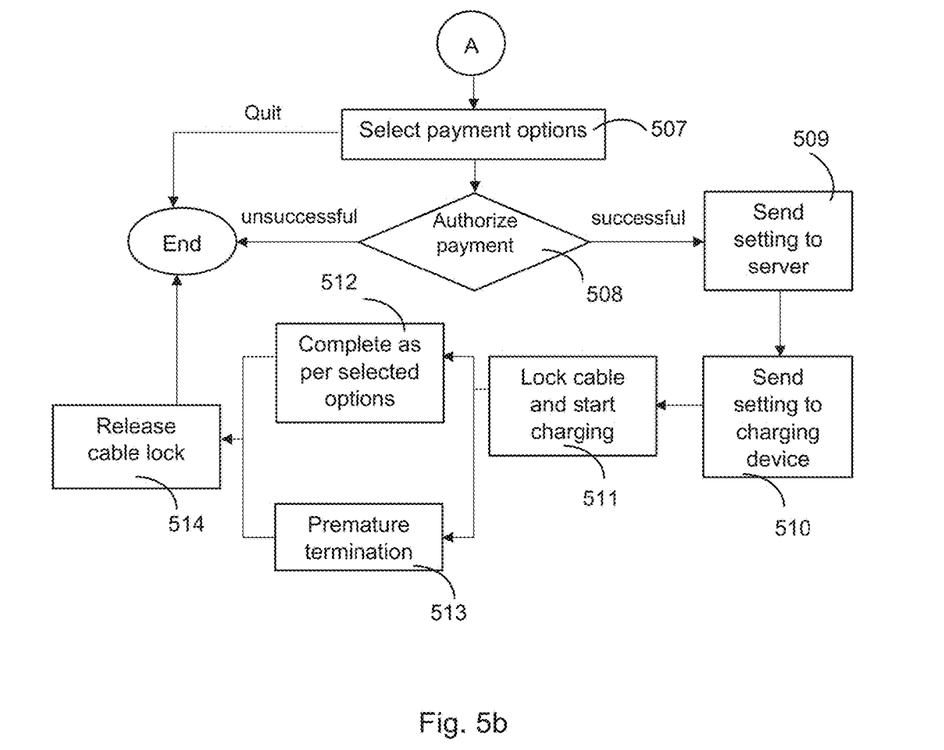

FIG. 5a and FIG. 5b collectively illustrate remote control for starting and stopping the charging and payment at the charging device 103, in accordance with an embodiment of the present application. At first, the user may drive the EV 108 to the charging device 103. At step 501, the user/driver may open the application on the user device 102. The charging device 103 may comprise a unique 2D bar code 105. The code 105 may be embedded with the exact location and the parameters of the charging device 103. The code 105 may enable easy identification of the charging device 103. By using the code of the charging device 103, the system 101 may send the one or more commands to the charging device 103 in order to control the charging at the charging device 103.

At step 502, the user/driver may point code scanner on the user device 102 to the 2D bar code and may further scan the 2D bar code of the charging device 103. The system 101 may receive the 2D bar code information, transmitted by the user device 102, the system 101 may further send the status of the charging device 103 to the user device 102. The status may enable the user/driver to know whether the charging device 103 is either ready or not ready for charging service. If the charging device 103 is not ready for the charging service, an action for the charging may be terminated. If the charging device 103 is ready, the user/driver may select the charging options.

At step 503, the user/driver may select the charging options. Normally, charging time and/or KWH may be seen at the charging device 103. Earlier, there was no indication about how many miles the EV can travel after charging for a particular period. The present application may allow the users/drivers to choose the terms which are familiar and useful to them. With the present application, the users/drivers may enter either one of the charging parameters, including but not limited to, charging duration, energy, percentage of battery capacity, travel range, cost, and the like.

In one embodiment, the charging duration may be entered, as an input, via the user device 102. The information of the charging duration may be sent to the system 101. Based on the input of the charging parameter for the EV 108, the system may calculate all other remaining parameters such as energy, travel range, percentage of battery capacity and amount. The system 101 may send the calculated parameters to the user device 102 that may be displayed on the screen of the user device 102. If the amount to be paid is entered or changed, the information may be sent to the system 101 and all the other four charging parameters may be re-calculated and displayed on the user device 102. The values corresponding to the one or more other parameters may be computed using predefined mathematical formulae.

$\$=e*r*t/60$ $d=e*m$ $e=c*t/60$ $t=60*e/c$ $\%=e/b$

Symbols:
 t=charging time in minutes,
 e=energy charged in KWH,
 $=amount to be paid,
 d=mileage,
 %=percentage of battery capacity,
 r=rate of per KWH,
 c=maximum charging energy,
 m=Mileage per KWH,
 b=battery capacity At step 504, based on the preliminary calculation, the user/driver may adjust one of the parameters in order to re-calculate the charging settings. For example, when the driver is using a BMW i3, if it is set for charging 60 minutes, based on the above formulae, the system may obtain the following assumption:
 t=60.00 minutes,
 e=7.40 KWH,
 d=43.73 KM,
 $=$14.80 @ 2.00 per KWH,
 %=33.64%

If the user/driver wishes to change the travel range from 43.73 KM to 50 KM, the system may re-calculate the parameters as follows:
 t=68.60 minutes,
 e=8.46 KWH,
 d=50.00 KM,
 $=$19.34 @ 2.00 per KWH,
 %=38.46%

The user/driver may change as many times in order to suit his/her charging requirements for the EV 108.

At step 505, the user may re-enter or change the charging parameters. At step 506, the system 101 may further calculate the amount value and transmit the value to the user device 102.

At step 507, the user/driver may proceed to payment after the charging parameters are confirmed. The user/driver may further select available payment gateway/options. The user may have an option to quit at this step.

At step 508, the user/driver may continue on authorizing the payment for the charging of the EV 108.

At step 509, the setting of the charging parameters may be sent to the system 101 after the payment is successful.

At step 510, the system 101 may relay the settings to the charging device 103.

At step 511, the charging device 103 may further lock the one or more safety covers (311,312), close the power switch 303 and may start charging of the EV 108 upon receiving of the command from the system 101.

At step 512, the user/driver may further monitor the status of the charging over the user device 102. At step 513, the user/driver may have an option to terminate the charge on time or pre-maturely. The user device 102 may further send the command for termination to the system 101. The system 101 may further relay the command to the controller 104 of the charging device 103. At step 514, the charging device 103 may open the power switch 303 and disconnect the electricity from the power output 106. The safety cover may be unlocked. The user/driver may unplug the charging cable 107 from the EV 108. The charging process of the EV 108 may be ended and the charging device 103 may be ready for the next EV 108.

Figure 6:
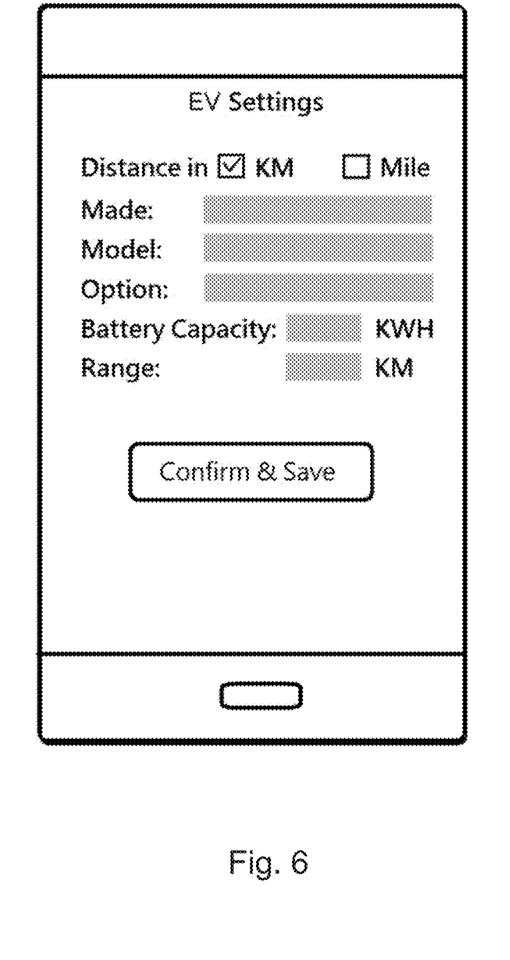
FIG. 6 illustrates a graphical user interface for the user/driver in order to set the EV 108 information on the user device 102, in accordance with an embodiment of the present application.

FIG. 6 illustrates a graphical user interface for the user/driver in order to set the EV 108 information on the user device 102, in accordance with an embodiment of the present application. At first, unit of measurement (for distance) may be selected on the user device 102. The unit of measurement may be in Imperial or Metric system. Based on the selection of measurement, the system 101 may utilize an appropriate set of formulas for calculation. In the next step, the user/driver may set make/brand, model and option (as shown in the FIG. 4) of the EV 108. The user/driver may further enter the battery capacity and range, referring the system 101 or the EV 108 user manual. The user may further "confirm and save" in order to save the settings. The system 101 may apply the settings, based on the input provided by the user/driver, in order to calculate charging duration, percent of battery capacity, an energy input and a charging amount.

Figure 7:
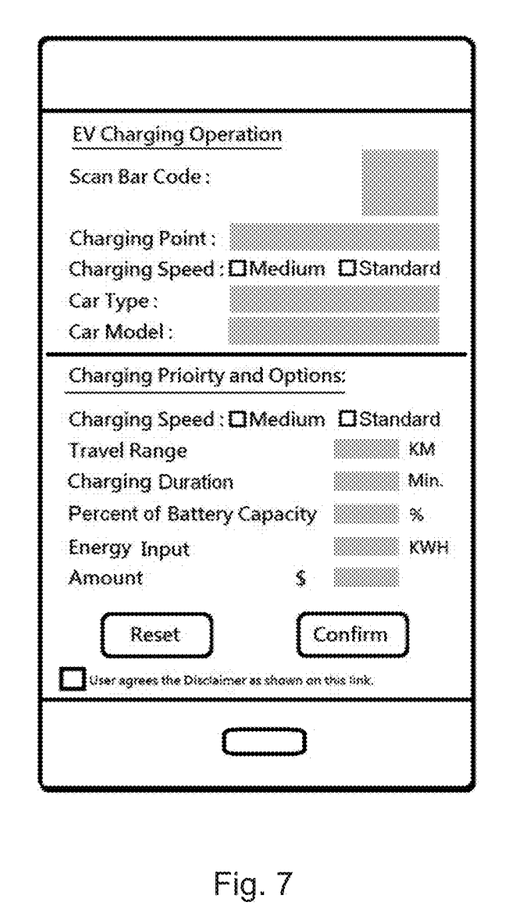
FIG. 7 illustrates a graphical user interface on the user device 102 at the charging device 103 for controlling the charging of the EV 108, in accordance with an embodiment of the present application.

FIG. 7 illustrates a graphical user interface on the user device 102 at the charging device 103 for controlling the charging of the EV 108, in accordance with an embodiment of the present application. The user/driver of the user device 102 may scan the 2D bar code 105 on the charging device 103. The code 105 may be read and the reading may be transmitted to the system 101 in order to ensure the user/driver about the exact location of the charging device 103. The location of the charging device 103 may ensure that the user/driver is at the right charging device. The user/driver may select the type of power output 106. The user may select either medium charge or standard charge. The maximum charging energy parameter (based on the above formula) may be different for the medium and the standard charge. The system 101 may automatically calculate the all other charging parameters based on the input of one of the charging parameter via the user device 102. The values of the parameters computed may be transmitted and displayed on the user device 101. The user/driver may change any of the charging parameters in order to suit as per his/her charging requirement. The user/driver may further change or confirm the charging parameters. After confirming the charging parameters, the user may be directed to a payment gateway 111 for payment. The payment may be cashless payment, using a credit card or internet banking. The charging of the EV 108 may be initiated, upon successful payment, in accordance to the last setting on the user device 102.

Although implementations for remotely controlling a charging device via a system and user device have been described in language specific to structural features and/or methods, it is to be understood that the appended claims are not necessarily limited to the specific features or methods described. Rather, the specific features and methods are disclosed as examples of implementations for remotely controlling a charging device via a system.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

What is claimed is:

1. A system for controlling charging of an electric vehicle, the system comprising:
   a system processor; and
   a system memory coupled with the system processor, wherein the system processor executes programmed instructions stored in the system memory for:
   capturing metadata and at least one input value from a user device present in a charging location, wherein the metadata is associated with a charging device, installed at the charging location, capable of charging one or more electric vehicles, wherein the metadata at least comprises geospatial data, charging device type, charging speed, and charging rate, and wherein the at least one input value corresponds to at least one charging parameter of a plurality of charging parameters associated with charging of the electric vehicle belonging to a user of the user device, wherein the plurality of charging parameters comprises a distance, charging duration, percent of battery capacity, an energy input and a charging amount;
   computing values corresponding to one or more other parameters of the plurality of charging parameters based upon the at least one input value captured from the user device;
   displaying the values computed corresponding to the one or more other parameters along with the at least one input value on the user device for validation by the user; and
   transmitting one or more control commands to the charging device after the validation of the values and the at least one input value, wherein the charging device is identified based upon the metadata associated with the charging device, and wherein the one or more control commands are indicative of charging the electric vehicle, by the charging device, based upon one or more of the validated values.

2. The system of claim 1, wherein the metadata is captured based upon scanning of a code associated with the charging device by the user device, wherein the code is one of a 2-dimensional (2D) code, a QR code, a bar code, and an RFID code.

3. The system of claim 1, wherein the values corresponding to the one or more other charging parameters are computed using predefined mathematical formulae.

4. The system of claim 3, wherein the values corresponding to one or more other parameters of the plurality of charging parameters are iteratively computed until the values displayed are validated by the user via the user device, and wherein the one or more other parameters are iteratively computed based upon iteratively capturing at least one input value, from the user device, corresponding to at least one charging parameter except the one or more other parameters of the plurality of charging parameters.

5. The system of claim 4, wherein the one or more commands are transmitted to the charging device after successful payment of the charging amount displayed and validated on the user device.

6. The system of claim 5, wherein the system processor further executes a programmed instruction for enabling the user to monitor status of the charging of the electric vehicle on the user device.

7. The system of claim 6, wherein the system processor further executes a programmed instruction for capturing an energy consumption value from a power meter of the charging device to validate the charging of the electric vehicle in accordance with the one or more commands.

8. The system of claim 7, wherein the system processor further executes a programmed instruction for receiving, from the user device, an input command to terminate the charging of the electric vehicle and thereby transmit a termination command to the charging device for terminating the charging of the electric vehicle.

9. A method for controlling charging of an electric vehicle, the method comprising:
   capturing, by a system processor, metadata and at least one input value from a user device present in a charging location, wherein the metadata is associated with a charging device, installed at the charging location, capable of charging one or more electric vehicles, wherein the metadata at least comprises geospatial data, charging device type, charging speed, and charging rate, and wherein the at least one input value corresponds to at least one charging parameter of a plurality of charging parameters associated with charging of the electric vehicle belonging to a user of the user device, wherein the plurality of charging parameters comprises a distance, charging duration, percent of battery capacity, an energy input and a charging amount;

computing, by the system processor, values corresponding to one or more other parameters of the plurality of charging parameters based upon the at least one input value captured from the user device;

displaying, by the system processor, the values computed corresponding to the one or more other parameters along with the at least one input value on the user device for validation by the user;

transmitting, by the system processor, one or more control commands to the charging device after the validation of the values and the at least one input value, wherein the charging device is identified based upon the metadata associated with the charging device, and wherein the one or more control commands are indicative of charging the electric vehicle, by the charging device, based upon one or more of the validated values;

closing, by a processor of the charging device, one or more power switches to trigger the charging of the electric vehicle in accordance with the one or more commands received; and opening, by the processor, the one or more power switches after the charging of the electric vehicle in accordance with the one or more commands received.

10. The method of claim 9 further comprising enabling the user device to scan a code embedding the metadata, wherein the code is one of a 2-dimensional (2D) code, a QR code, a bar code, and an RFID code.

11. The method of claim 9, wherein the values corresponding to the one or more other charging parameters are computed using predefined mathematical formulae.

12. The method of claim 10 further comprising iteratively computing the values corresponding to one or more other parameters of the plurality of charging parameters until the values displayed are validated by the user via the user device, and wherein the one or more other parameters are iteratively computed based upon iteratively capturing at least one input value, from the user device, corresponding to at least one charging parameter except the one or more other parameters of the plurality of charging parameters.

13. The method of claim 12 further comprising enabling, via the system processor, the user to monitor status of the charging of the electric vehicle on the user device.

14. The method of claim 13 further comprising capturing, by the system processor, an energy consumption value from a power meter of the charging device to validate the charging of the electric vehicle in accordance with the one or more commands.

15. The method of claim 14 further comprising receiving, by the system processor, an input command from the user device to terminate the charging of the electric vehicle and thereby transmit a termination command to the charging device for terminating the charging of the electric vehicle.

* * * * *